(12) United States Patent
Seager

(10) Patent No.: US 10,749,913 B2
(45) Date of Patent: Aug. 18, 2020

(54) TECHNIQUES FOR MULTIPLY-CONNECTED MESSAGING ENDPOINTS

(71) Applicant: INTEL CORPORATION, Santa Clara, CA (US)

(72) Inventor: Kayla O'Keeffe Seager, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 147 days.

(21) Appl. No.: 16/143,954

(22) Filed: Sep. 27, 2018

(65) Prior Publication Data

US 2019/0044982 A1 Feb. 7, 2019

(51) Int. Cl.
| | |
|---|---|
| *H04L 29/06* | (2006.01) |
| *G06F 9/48* | (2006.01) |
| *G06F 9/38* | (2018.01) |
| *G06F 9/54* | (2006.01) |
| *G06F 9/30* | (2018.01) |
| *G06F 9/50* | (2006.01) |

(52) U.S. Cl.
CPC ...... *H04L 65/1069* (2013.01); *G06F 9/30123* (2013.01); *G06F 9/3851* (2013.01); *G06F 9/4843* (2013.01); *G06F 9/5027* (2013.01); *G06F 9/54* (2013.01); *G06F 9/541* (2013.01); *G06F 9/544* (2013.01)

(58) Field of Classification Search
CPC ............. H04L 65/1069; G06F 9/30123; G06F 9/3851; G06F 9/4843; G06F 9/5027; G06F 9/54; G06F 9/541; G06F 9/544
See application file for complete search history.

(56) References Cited

U.S. PATENT DOCUMENTS

| | | | | |
|---|---|---|---|---|
| 6,856,619 | B1 * | 2/2005 | Haugseth | H04L 69/12 370/235 |
| 7,543,067 | B2 * | 6/2009 | Matsubayashi | G06F 9/546 709/207 |
| 2013/0195108 | A1 | 8/2013 | Hu et al. | |
| 2016/0072908 | A1 * | 3/2016 | Dinan | H04L 67/10 709/204 |

(Continued)

OTHER PUBLICATIONS

European Patent Office. "Search Opinion for Application No. 19 183 097.5", publicly posted Jan. 17, 2020, 9 pages. (Year: 2020).*

(Continued)

*Primary Examiner* — George C Neurauter, Jr.

(57) ABSTRACT

Various embodiments are generally directed to techniques for multiply-connected messaging endpoints, such as for communication between processes of a distributed computing system. Some embodiments are particularly directed to communication over a connectionless fabric between distributed computing (DC) threads, or DC processes comprised thereof, that are implemented in a connection-oriented framework. In several embodiments, establishment of this communication may be referred to as wire-up. In many embodiments, various DC processes on a distributed computing device may utilize respective connection manager (CM) endpoints to establish communication via a common messaging endpoint.

25 Claims, 9 Drawing Sheets

(56) References Cited

U.S. PATENT DOCUMENTS

2018/0183695 A1* 6/2018 Hebenstreit .......... H04L 43/106

OTHER PUBLICATIONS

European Patent Office. "European Search Report for Application No. EP 19 18 3097", publicly posted Jan. 17, 2020, 3 pages. (Year: 2020).*
Vrijders Sander et al: "Prototyping the Recursive InterNet Architecture: The IRATI project approach", IEEE Network, IEEE Service Center, New York, NY, US, vol. 28, No. 2, Apr. 11, 2014.
Eduard Grasa et al: "Developing a RINA prototype over UDP/IP using TINOS" Proceedings of the 7th International Conference on Future Internet Technologies, CFI '12, Sep. 11, 2012, p. 31.
European Search Report for the European Patent Application No. EP19183097, dated Jan. 17, 2020, 13 pages.

* cited by examiner

Post a receive buffer at a local connection manager (CM) endpoint address, the receive buffer for a first communication in a connection initiator format, the connection initiator format to include a remote CM address block and a remote messaging address block
602

Identify a first communication of the connection initiator format in the receive buffer, the first communication to include a remote CM endpoint address in the remote CM address block and a remote messaging endpoint address in the remote messaging address block;
604

Update an address mapping with the remote messaging endpoint address to enable communication with the remote messaging endpoint address;
606

Generate a second communication in a connection responder format to transmit to the remote CM endpoint address, the connection responder format to include a local messaging address block and the second communication to include a local messaging endpoint address in the local messaging endpoint address block
608

Establish communication between a remote distributed analysis (DA) process thread and a local DA process thread via the remote messaging endpoint address and the local messaging endpoint address based on the first communication, the second communication, and the address mapping
610

FIG. 7

Storage Medium 700

*Computer Executable Instructions for 600*

TECHNIQUES FOR MULTIPLY-CONNECTED MESSAGING ENDPOINTS

BACKGROUND

Generally, distributed computing may refer to a field of computer science that utilizes distributed systems. A distributed system may include a system with components located on one or more different networked devices. Typically, the components of a distributed system coordinate efforts, such as via passing messages to one another, to achieve an objective. A computer program that operates within a distributed system is usually referred to as a distributed program. Distributed programs can be a collections processes made up of one or more threads that are executed by one or more components of the distributed system to achieve the objective.

BRIEF DESCRIPTION OF THE DRAWINGS

FIG. 6 illustrates an embodiment of a first logic flow according to one or more embodiments described herein.

FIG. 7 illustrates an embodiment of a storage medium according to one or more embodiments described herein.

DETAILED DESCRIPTION

Figure 1:
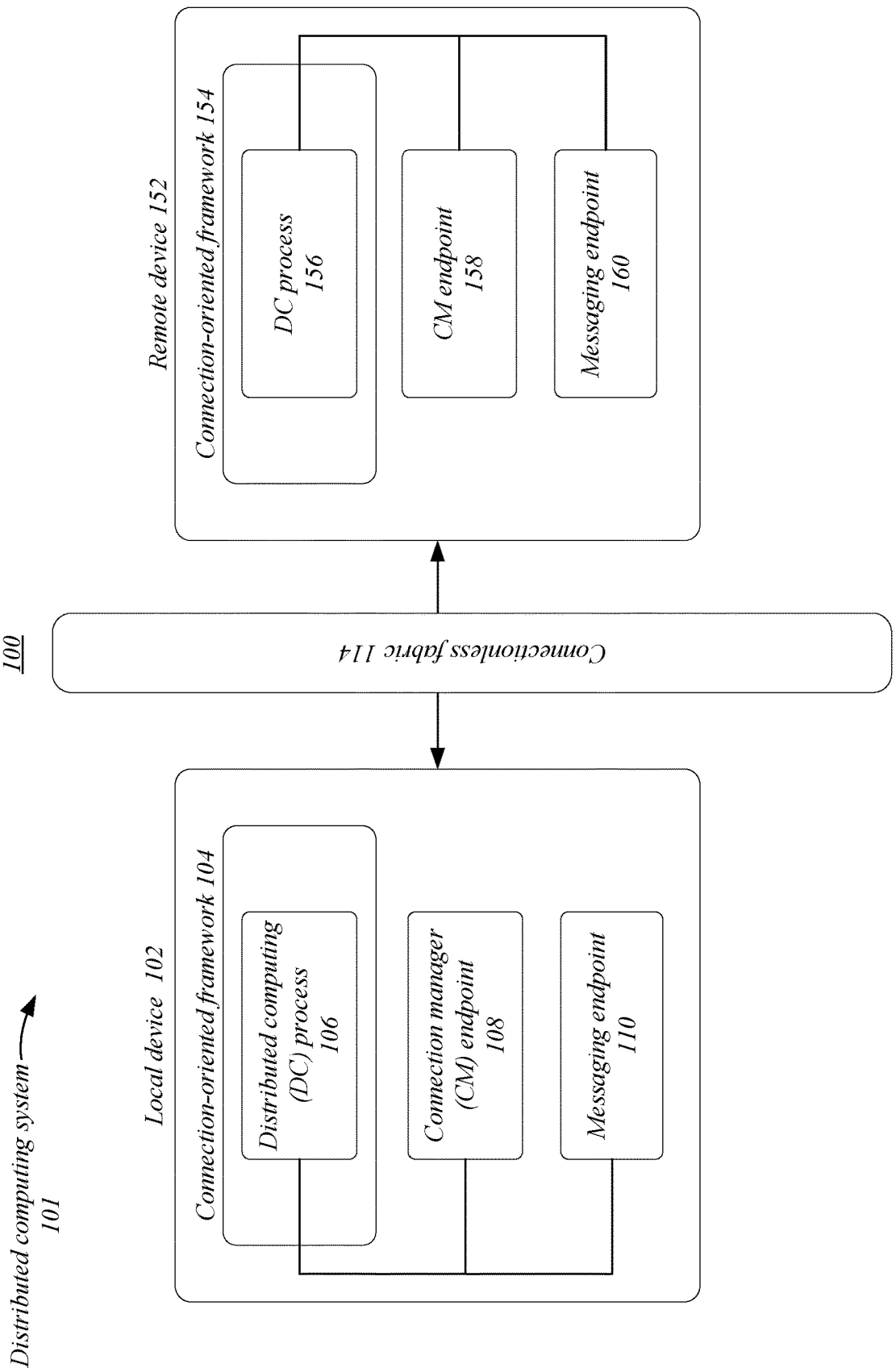
FIG. 1 illustrates exemplary aspects of a distributed computing system according to one or more embodiments described herein.

Various embodiments are generally directed to techniques for multiply-connected messaging endpoints, such as for communication between processes of a distributed computing system. Some embodiments are particularly directed to communication over a connectionless fabric between distributed computing (DC) threads, or DC processes comprised thereof, that are implemented in a connection-oriented framework. In several embodiments, establishment of this communication may be referred to as wire-up. In many embodiments, various DC processes on a distributed computing device may utilize respective connection manager (CM) endpoints to establish communication via respective messaging endpoints. These and other embodiments are described and claimed.

Some challenges facing distributed computing systems include the inability establish communication between different DC processes, or DC threads therein, without excessive computing overhead and unnecessary network contention. Such challenges may result from DC processes and DC threads operating within a connection-framework, and communication therebetween having to traverse a connectionless fabric. Sometimes these challenges may lead to heavy reliance on support from third-party solutions for connection management. For instance, operating system (OS) support and extra thread resources for progress and management may be required. In one or more embodiments, communication may utilize an application programming interface (API) standard that require a process manager for process information. These requirements can create dependencies on third-party libraries and typically involve inefficient transmission control protocol (TCP)/internet protocol (IP) collective exchanges and/or synchronization.

Further, connection management may rely on specialized process management systems and/or interfaces that fail to expose advanced capability sets. For instance, a dedicated progress thread may watch for updates from the OS on a set of file descriptors that include connection management and messaging. Adding further complexity, these communication techniques may implement messaging schemes that result in blocking. For example, each messaging connection may rely on a separate dedicated socket, such as the same as or similar to how connection management over Ethernet is handled. These and other factors may result in inefficient communication between different DC threads with limited functionality. Such limitations can reduce performance of a distributed computing system, contributing to inflexible systems with deficient performance and decreased applicability.

Various embodiments described herein include a connection management scheme that efficiently and effectively enables connection-oriented frameworks to wire-up over connectionless transports. For example, the connection management scheme may address the connection management needs of multiply-connected messaging endpoints on a high-speed, reliable, connectionless fabric. In many embodiments, a dedicated resource for connection management for each DC process (e.g., CM endpoint) may be created while utilizing a user thread in combination with a completion queue to eliminate the need for a communication management thread. In one or more embodiments, all messaging connections for a process can be realized via a common messaging endpoint on each device, preventing the need to create a new messaging endpoint for each connection established. In some embodiments, an independent fabric endpoint may be established, and a non-blocking communication scheme may be used to effectively interleave connection management with other operations on the same process. In various embodiments, an optimized communication scheme and detection capability may be used for a self-connect case (e.g., connection between two threads in the same process).

Several embodiments described herein may include, realize, and/or implement one or more of the following. Some embodiments may include a connection management scheme targeted at high performance connectionless fabrics usage in artificial intelligence frameworks with no third-party dependencies. Many embodiments may enable connection-oriented frameworks to wire-up connectionless transports. One or more embodiments may create a host fabric interface (HFI) command queue communication context per process that is dedicated to connection management. Such embodiments may require only one additional context for messaging. In various embodiments, the two contexts may be reused for all communication. In several embodiments, connection management exchange protocol may piggyback connection management context address on messaging address exchange. Various embodiments may utilize asynchronous non-blocking capabilities to intermittently poll a completion queue for connection requests. In some embodiments, this may facilitate one or more of stimulating a progress engine, maintaining acceptable periodic progress on connection creation, and introducing negligible interference with main computation. In these and other ways various embodiments described herein may enable efficient and reliable communication between distributed computing components in an accurate, optimized, dynamic, and scalable manner, resulting in several technical effects and advantages including increased capabilities and improved applicability.

In one embodiment, for example, an apparatus may include a processor and a memory comprising instructions that when executed by the processor cause the processor to perform one or more of the following. In some embodiments, the processor may be caused to post a receive buffer at a local connection manager CM endpoint address. In some such embodiments, the receive buffer may be for a first communication in a connection initiator format that includes a remote CM address block and a remote messaging address block. In various embodiments, the processor may be caused to identify a first communication of the connection initiator format in the receive buffer. In various such embodiments, the first communication may include a remote CM endpoint address in the remote CM address block and a remote messaging endpoint address in the remote messaging address block. In several embodiments, the processor may be caused to update an address mapping with the remote messaging endpoint address to enable communication with the remote message endpoint address. In one or more embodiments, the processor may be caused to generate a second communication in a connection responder format to transmit to the remote CM endpoint address. In one or more such embodiments, the connection responder format may include a local messaging address block and the second communication may include a local messaging endpoint address in the local messaging endpoint address block. In many embodiments, the processor may be caused to establish communication between a remote DC process thread and a local DC process thread via the remote messaging endpoint address and the local messaging endpoint address based on the first and second communications.

In another embodiment, for example, an apparatus may include a processor and a memory comprising instructions that when executed by the processor cause the processor to perform one or more of the following. In various embodiments, the processor may be caused to generate a first communication in a connection initiator format to transmit to a remote CM endpoint address from a local CM endpoint address. In various such embodiments, the connection initiator format may include a local CM address block and a local messaging address block. In some embodiments, the processor may be caused to post a receive buffer at the local CM endpoint address based on the first communication. In many embodiments, the processor may be caused to identify a second communication of a connection responder format. In many such embodiments, the connection responder format may include a remote messaging address block and the second communication may include a remote messaging endpoint address in the remote messaging endpoint address block. In several embodiments, the processor may be caused to update an address mapping with the remote messaging endpoint address to enable communication with the remote message endpoint address. In one or more embodiments, the processor may be caused to establish communication between a remote DC process thread and a local DC process thread via the remote messaging endpoint address and the local messaging endpoint address based on the first communication, the second communication, and the address mapping.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates exemplary aspects of a distributed computing system 101 in environment 100 according to one or more embodiments described herein. Distributed computing system 101 may be the same or similar to one or more other distributed computing systems or components thereof described herein. The distributed computing system 101 may include a local device 102 and a remote device 152 that communicate over a connectionless fabric 114. In some embodiments, the local device 102 may include a DC process 106 that operates within a connection-oriented framework 104 and the remote device 152 may include another DC process 156 that operates within a connection-oriented framework 154. In one or more embodiments described herein, DC process 106 and DC process 156 may communicate via the connectionless fabric 114. In many embodiments, communication between DC process 106 and DC process 156 may be facilitated with a CM endpoint 108 and a messaging endpoint 110 located at the local device 102 and a CM endpoint 158 and a messaging endpoint 160 located at the remote device 152. Embodiments are not limited in this context.

In several embodiments, distributed computing system 101 may utilize local device 102 and remote device 152 to perform one or more aspects of a collective computing objective. For example, the distributed computing system 101 may be utilized for one or more of high performance computing (HPC), artificial intelligence (AI) workloads, and machine learning (ML) workloads. It will be appreciated that although only two devices 102, 152 are illustrated with respect to distributed computing system 101, any number of devices may collectively form the distributed computing system 101. In various embodiments, the use of 'local' (e.g., local device 102) and the use of 'remote' (e.g., remote device 152) may be used for clarity of description to distinguish devices connected via a network (e.g., connectionless fabric 214). In some embodiments, local device 102 and remote device 152 may be duplicate, similar, or different devices. For example, local device 102 may include a server device and remote device 152 may include a client device, or vice-a-versa. In further examples, local device 102 and remote device 152 may be commodity computing platforms or local device 102 may be optimized for a first task (e.g., DC process 106) while remote device 152 is optimized for a second task (e.g., DC process 156).

In some embodiments, local device 102 and remote device 152 may communicate over connectionless fabric 114. In many embodiments, connectionless fabric 114 may refer to a network without a dedicated communication path between each set of endpoints, such as the internet. In some embodiments, the connectionless fabric 114 may not require a circuit to be established before data is transmitted. In one or more embodiments, information packets sent over the connectionless fabric 114 may be routed independently of any other information packets sent over the connectionless fabric. In various embodiments, the connectionless fabric 114 may include and/or utilize a high-performance communication architecture, such as Intel® Omni-Path Architecture. On the other hand, in many embodiments, connection-oriented frameworks 104, 154 may depend on dedicated paths between communicating components. In some embodiments, the connection-oriented frameworks 104, 154 may include any programing framework used for distributed computing, such as one or more of an HPC framework, an AI framework, and a ML framework (e.g., MXNet). In several embodiments, connection-oriented frameworks 104, 154 may be the same or similar.

Various embodiments described herein include a connection management scheme that efficiently and effectively enables connection-oriented frameworks 104, 154 to wire-up over connectionless fabric 114. In some instances, CM endpoints 108 may be responsible for establishing communication via messaging endpoints 110, 160. In many embodiments, a dedicated resource for connection management for each DC process (e.g., CM endpoint 108 for DC process 106 and CM endpoint 158 for DC process 156) to eliminate the need for a communication management thread. In one or more embodiments, all messaging connections can be realized via a common messaging endpoint for each process on each device (e.g., messaging endpoint 110 on local device 102 and messaging endpoint 160 on remote device 152). In one or more such embodiments, this can prevent the need to create a new messaging endpoint for each connection established with a process, as will be discussed in more detail below, such as with respect to FIG. 2. In many embodiments, one or more features and/or components described herein may provide a high performance and low dependency solution to connection management needed to port connection-oriented frameworks (e.g. connection-oriented framework 104) to connectionless fabrics (e.g., connectionless fabric 114).

Many embodiments described herein may include, realize, and/or implement one or more of the following. Some embodiments may include a connection management scheme targeted at high performance connectionless fabrics usage in artificial intelligence frameworks with no third-party dependencies. Many embodiments may enable connection-oriented frameworks to wire-up connectionless transports. One or more embodiments may create a host fabric interface (HFI) command queue communication context per process (e.g., DC process 106) that is dedicated to connection management (e.g., CM endpoint 108). Such embodiments may require only one additional context for messaging (e.g., messaging endpoint 110). In various embodiments, the two contexts may be reused for all communication.

Figure 2:
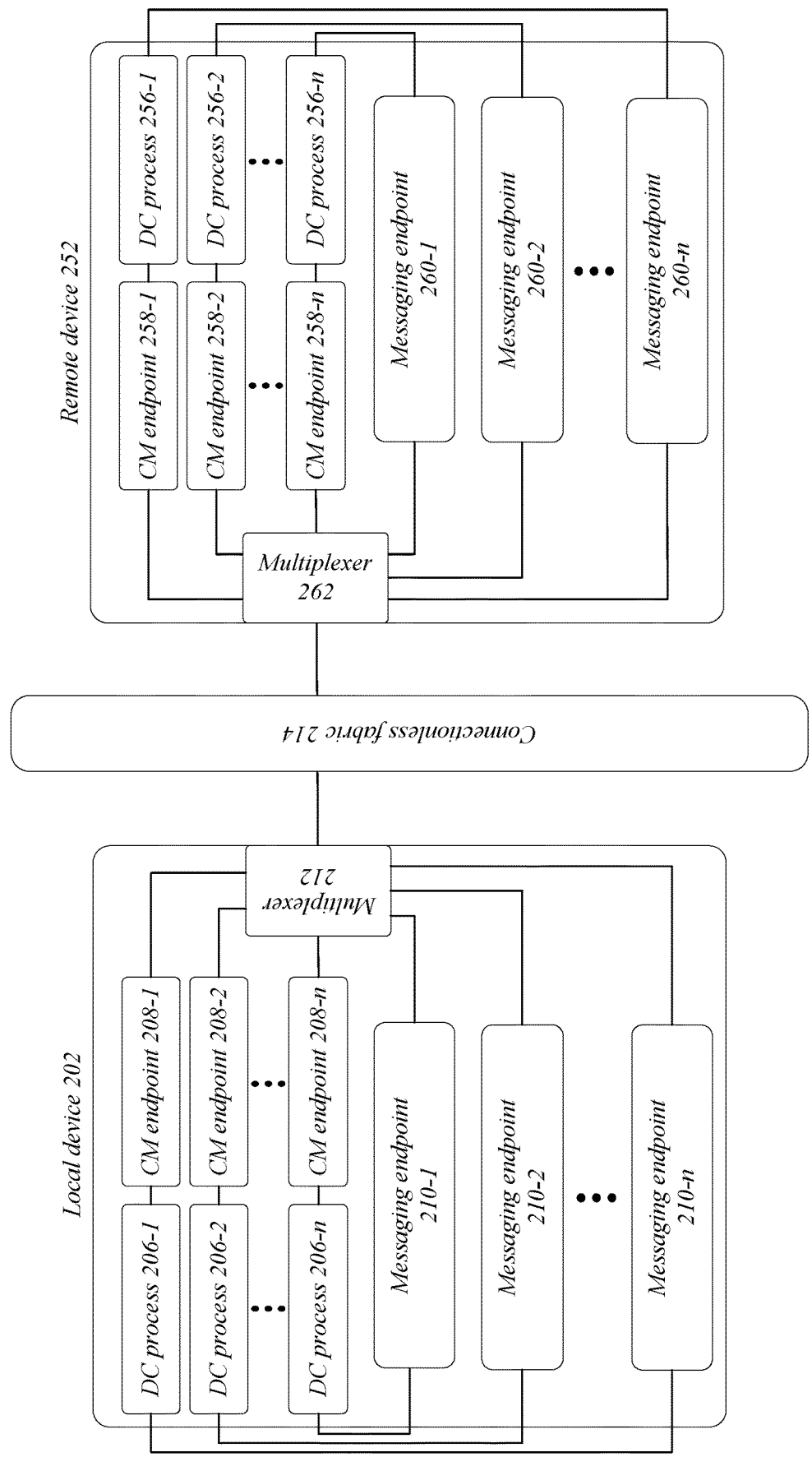
FIG. 2 illustrates exemplary aspects of communication between devices in a distributed computing system according to one or more embodiments described herein.

FIG. 2 illustrates exemplary aspects of a distributed computing system 201 in environment 200 according to one or more embodiments described herein. Distributed computing system 201 may be the same or similar to one or more other distributed computing systems or components thereof described herein. The distributed computing system 201 may include a local device 202 and a remote device 252 that communicate over a connectionless fabric 214. In some embodiments, local device 202 may include one or more DC processes 206-1, 206-2, 206-n with a corresponding one or more CM endpoints 208-1, 208-2, 208-n and remote device 252 may include one or more DC processes 256-1, 256-2, 256-n with a corresponding one or more CM endpoints 258-1, 258-2, 258-n. In various embodiments described herein, one or more of the DC processes 206 on local device 202 may communicate with one or more of the DC processes 256 on remote device 252. In various such embodiments, communication between DC processes may be set up via corresponding CM endpoints and occur via respective messaging endpoints 210-1, 210-2, 210-n and messaging endpoints 260-1, 260-2, 260-n. In several embodiments, one or more communications, or portions thereof, from CM endpoints 208 and messaging endpoints 210 may be multiplexed by multiplexer 212 prior to being sent over the connectionless fabric 214 and one or more communications, or portions thereof, from CM endpoints 258 and messaging endpoints 260 may be multiplexed by multiplexer 262 prior to being sent over the connectionless fabric 214. Similarly, in several such embodiments, multiplexers 212, 262 may demultiplex communications received over the connectionless fabric 214. Embodiments are not limited in this context.

In many embodiments, CM endpoints 208, 258 and messaging endpoints 210, 260 may include network endpoints. In many such embodiments, network endpoints may include or refer to a command queue communication context on a high-speed reliable interconnect (e.g., connectionless fabric 214). In some embodiments, connectionless endpoints (e.g., messaging endpoints 210) may enable a single endpoint resource to be multiply-connected to other processes. In various embodiments, a connectionless endpoint may be globally identified with addresses. In various such embodiments, these addresses may have to be exchanged between endpoints in order to communicate between the endpoints. Accordingly, one or more embodiments described herein, may utilize CM endpoints for address exchange to enable communication between messaging endpoints.

In several embodiments, two multiply-connected resources (e.g., CM endpoint 208-1 and messaging endpoint 210-1), which are independent channels of communication, may be used per process (e.g., DC process 206-1) for a pairwise connection management exchange. In some embodiments, one endpoint (e.g., CM endpoint 208-1) may be dedicated to connection management and may manage the connections for a single connectionless endpoint (e.g., messaging endpoint 210-1) that handles the messaging for all the connections with a process (e.g., all the connections for DC process 206-1). In various embodiments, the connection management endpoint (e.g., CM endpoint 208-1) may be used on a named server process (e.g., DC process 206-1). In various such embodiments, the CM endpoint may wait for incoming connection requests (e.g., CM endpoint 208-1 for DC process 206-1), add an address in a received connection requests to a list of known addresses for the messaging endpoint (e.g., an address for messaging endpoint 260-1 is added to a list of known addresses for messaging endpoint 210-1 in response to a connection request received from CM endpoint 258-1 for DC process 256-1), and return to the requesting process the address of the corresponding messaging endpoint (e.g., CM endpoint 208-1 sends the address of messaging endpoint 210-1 to CM endpoint 258-1). From the perspective of the process requesting the connection (e.g., CM endpoint 258-1), the request is sent to the named server (e.g., CM endpoint 208-1) with the address of the messaging endpoint (e.g., address of messaging endpoint 260-1), the address for the messaging endpoint of the named server process (e.g., address of messaging endpoint 210-1) is received in response, and the address for the messaging endpoint of the named server process (e.g., address of messaging endpoint 210-1) is added to the known address list for the messaging endpoint of the requesting device (e.g., messaging endpoint 260-1).

In various embodiments, the address exchange processes described above operate in a non-blocking manner in which the exchange is performed while being interleaved with messaging between previously established connections (e.g., via multiplexer 212 and/or multiplexer 262). This is in contrast to a sockets connection management model where a new connection file descriptor is made for each connection established. Further, as the endpoints used for establishing communication (e.g., CM endpoints 208, 258 are connectionless only a single endpoint resource may be created for the lifetime of the connection management exchange, similarly only one other endpoint is used per process for messaging on both the local and remote devices 202, 252 (e.g., messaging endpoints 210, 260).

In some embodiments, as previously described, the implementation of the connection management model described herein may utilize the creation of an endpoint per process dedicated to connection management (e.g., each DC process has a respective CM endpoint). In various embodiments, the CM endpoints are able to send and receive data and have an associated completion queue, as will be described in more detail below (see e.g., FIGS. 3 and 4). In one or more embodiments, the connection manager endpoint can be associated with a specific address if the process is intended to be used as a named server (e.g., as a message queue server). In several embodiments, the separate CM endpoint (e.g., CM endpoint 208-1) can ensure that connection management communication does not interfere with any other messaging the process (e.g., DC process 206-1) performs. For instance, CM endpoints may only use non-blocking communication in order to overlap connection management with other operations within the same thread of execution, such as via multiplexer 212. In many embodiments, completion of outstanding connection management operation may be checked periodically for named servers, otherwise outstanding connection management operations are forced to complete once a non-connection management related send or receive operation is requested, but before the non-connection management related send or receive operation is performed. In various embodiments, priorities may be used in conjunction with multiplexing of messages. In some embodiments, the completion queue mechanism may utilize asynchronous capabilities of the connection fabric 214 (e.g., asynchronous capabilities in Intel® Omni-Path fabric).

Figure 3:
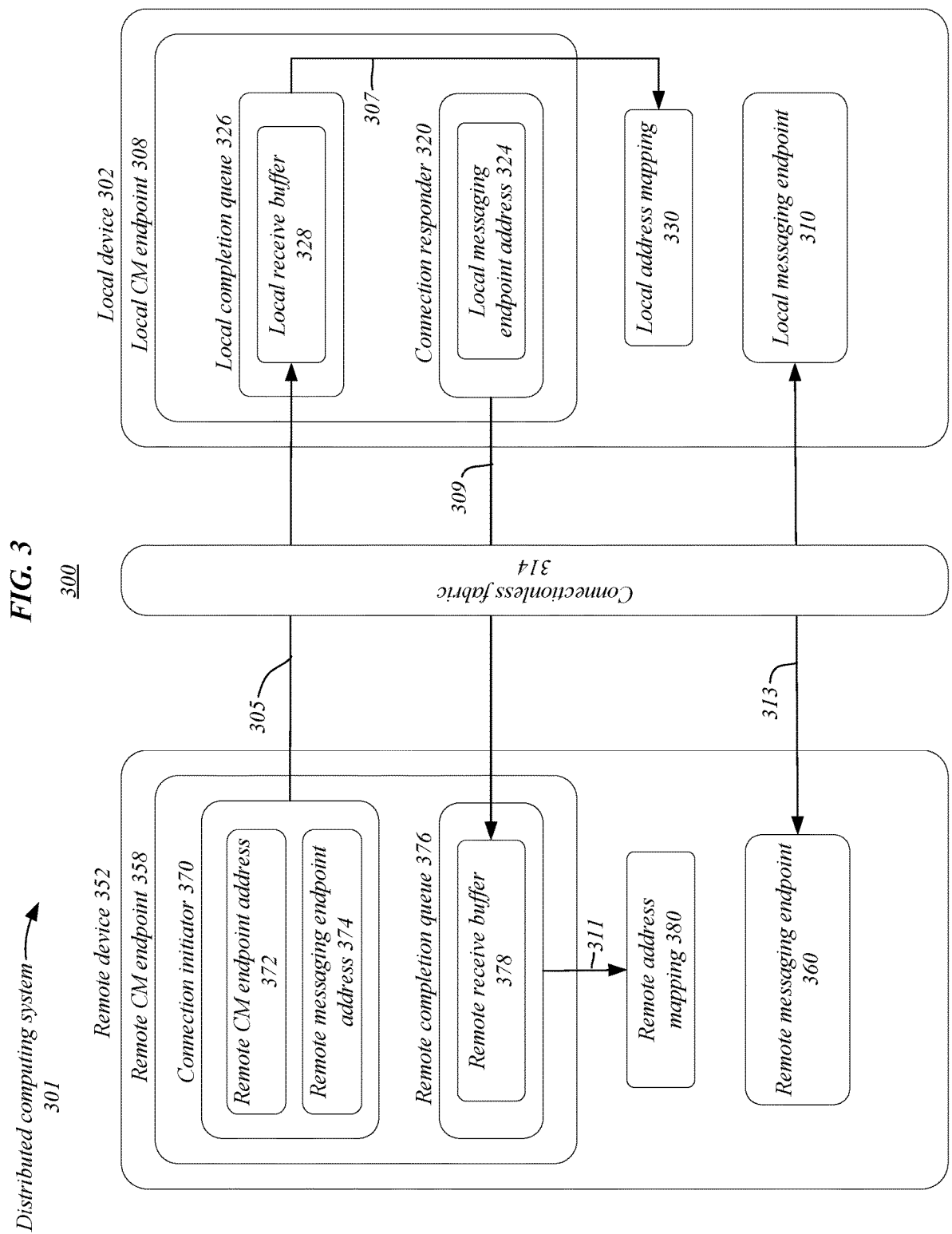
FIG. 3 illustrates exemplary aspects of establishing communication between processes of a distributed computing system according to one or more embodiments described herein.

FIG. 3 illustrates exemplary aspects of establishing communication between processes of a distributed computing system 301 in environment 300 according to one or more embodiments described herein. Distributed computing system 301 may be the same or similar to one or more other distributed computing systems or components thereof described herein. The distributed computing system 301 may include remote device 352 and local device 302 that establish communication over connectionless fabric 314. In various embodiments, remote device 352 may include remote CM endpoint 358 including connection initiator 370 with remote CM endpoint address 372 and remote messaging endpoint address 374 and remote completion queue 376 with remote receive buffer 378, remote address mapping 380 and remote messaging endpoint 360. In many embodiments, local device 302 may include local CM endpoint 308 with local completion queue 326 including local receive buffer 328 and connection responder 320 including local messaging endpoint address 324, local address mapping 330, and local messaging endpoint 310. In one or more embodiments, a connection management exchange according to the scheme connection management scheme described herein may be performed between remote device 352 and local device 302, as will be described in more detail below. Embodiments are not limited in this context.

In various embodiments, the connection management exchange may begin with local device 302 posting a non-blocking receive with a wildcard source address, such as via local receive buffer 328 in local completion queue 326. In various such embodiments, local device 302 may include or be a named server. In many embodiments, the posted receive may enable servicing of connection management requests from remote processes. In many such embodiments, the posted receive may be a non-blocking receive. In the illustrated embodiments, the receive uses local receive buffer 328 that anticipates a message comprising the connection management endpoint address (e.g., remote CM endpoint address 372) of the sender (e.g., remote device 352) as well as the address of the endpoint that will be used for non-connection management related messaging (e.g., remote messaging endpoint address 374). In some embodiments a Boolean flag (see e.g., queue status indicator 432 of FIG. 4) may be used to remind the named server that it should consistently check and service its completion queue (e.g., local completion queue 326) associated with the posted receive in order to resolve incoming connection requests. In some embodiments, as will be described in more detail below, the named server may periodically interrupt any blocking sending or receiving messages that are not connection management related. In some such embodiments, this may ensure the named server does not block remote processes that are waiting for a response.

In several embodiments, remote device 352 may send a connection request in a connection initiator 370 in a format that includes a block for each of a CM endpoint address and a messaging endpoint address. In several such embodiments, the connection initiator 370 may be sent in a non-blocking send. Accordingly, at 305, remote device 352 may send connection initiator 370 with remote CM endpoint address 372 and remote messaging endpoint address 374 to local device 302 for receipt at the local receive buffer 328 of the local completion. Further, a non-blocking receive may be posted with remote receive buffer 378 of remote completion queue 376 that anticipates the messaging endpoint address of the named server. In some embodiments, the outstanding connection request may be tracked with a variable (see e.g., queue status indicator 482 of FIG. 4). In some such embodiments, this indicator may be used to force completion of all outstanding connection requests once the process decides to start sending and receiving messages from other processes.

In one or more embodiments, the local device 302 may identify the connection initiator 370 in the local completion queue 326. In one or more such embodiments, in response to identifying the connection initiator 370 in the local completion queue 326, the remote messaging endpoint address 374 may be stored in local address mapping 330 at 307. Further, local device 322 may send a connection responder 320 in a format that includes a block for a messaging endpoint address. Accordingly, at 309, local device 302 may send connection responder 320 with local messaging endpoint address 324 to remote device 352 for receipt at the remote receive buffer 378 of the remote completion queue 376. In many embodiments, local device 302 may repost the local receive buffer 328 either during or after processing connection initiator 370.

In some embodiments, the remote device 352 may identify the connection responder 320 in the remote completion queue 376. In some such embodiments, in response to identifying the connection responder 320 in the remote completion queue 376, the local messaging endpoint address 324 may be stored in remote address mapping 380 at 311. In many embodiments, the connection responder 320 with local messaging endpoint address 324 is received via the non-blocking receive posted with remote receive buffer 378 of remote completion queue 376 that anticipates the messaging endpoint address of the named server. In many embodiments, once the address exchange has completed, messaging between local messaging endpoint 310 and remote messaging endpoint 360 may begin at 313.

Figure 4:
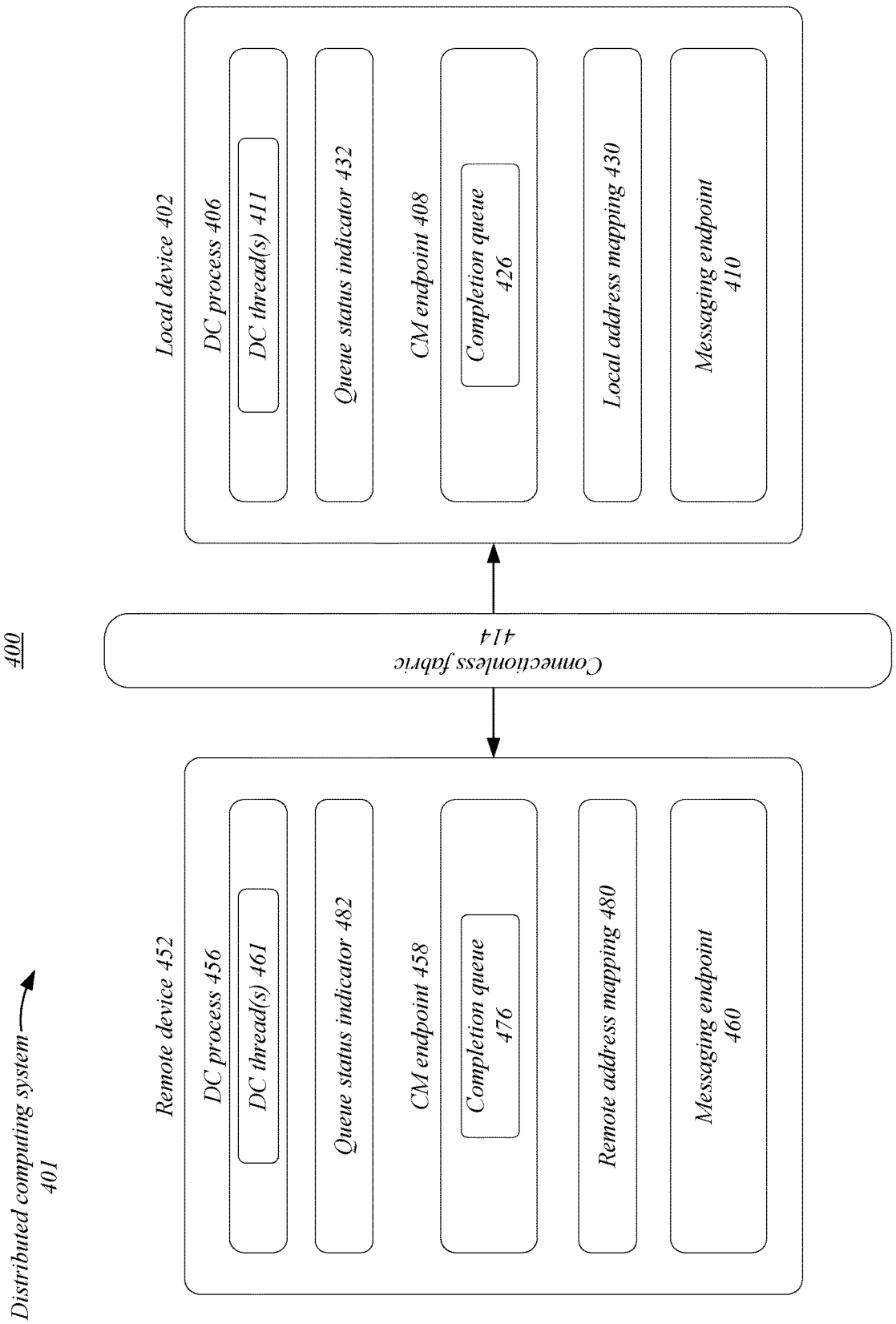
FIG. 4 illustrates exemplary aspects of devices in a distributed computing system according to one or more embodiments described here.

FIG. 4 illustrates exemplary aspects of remote device 452 and local device 402 in distributed computing system 401 in environment 400 according to one or more embodiments described herein. Distributed computing system 401 may be the same or similar to one or more other distributed computing systems or components thereof described herein. In environment 400, the distributed computing system 401 may include remote device 452 and local device 402. Remote device 452 may include DC process 456 with one or more DC threads 461, queue status indicator 482, CM endpoint 458 with completion queue 476, remote address mapping 480, and messaging endpoint 410. Local device 402 may include DC process 406 with one or more DC threads 411, queue status indicator 432, CM endpoint 408 with completion queue 426, local address mapping 430, and messaging endpoint 460. In one or more embodiments, queue status indicator 482 may enable DC process 456 to track the status of requests and/or responses in completion queue 476 and queue status indicator 432 may enable DC process 406 to track the status of requests and/or responses in completion queue 426, as described above. Embodiments are not limited in this context.

In various embodiments, DC processes 406, 456 may include one or more DC threads 411, 461. In various such embodiments, two DC threads of the same DC process may seek to communicate. In such situations, as the threads share the same connection management endpoint (e.g., CM endpoint 458 for DC threads in DC process 456), a shortened exchange may be performed. In some embodiments, the shortened exchange may require that thread-safe usage of the connection management endpoint is assured. In many embodiments, the shortened exchange may only need a portion of the connection management exchange described with respect to FIG. 3. In several embodiments, this may result from the fact that both threads already know the messaging endpoint. In various embodiments, each of the DC threads 461 of DC process 456 may utilize a common CM endpoint 458 and messaging endpoint 460. Similarly, each of the DC threads 411 of DC process 406 may utilize a common CM endpoint 408 and messaging endpoint 410.

In some embodiments, the thread requesting the connection management exchange may first check if the named server address it is connecting to is the same as its connection management endpoint address. If so, the requesting thread may send this address to notify the named server of the self-connect and save its own messaging address to the address mapping (e.g., remote address mapping 480). In various embodiments, this may terminate the exchange on the requesting side. The named server may check whether incoming requests include an identical CM endpoint address and/or if a self-connect is identified. If so, the named server will save its messaging address to the address mapping as a known partner.

Figure 5:
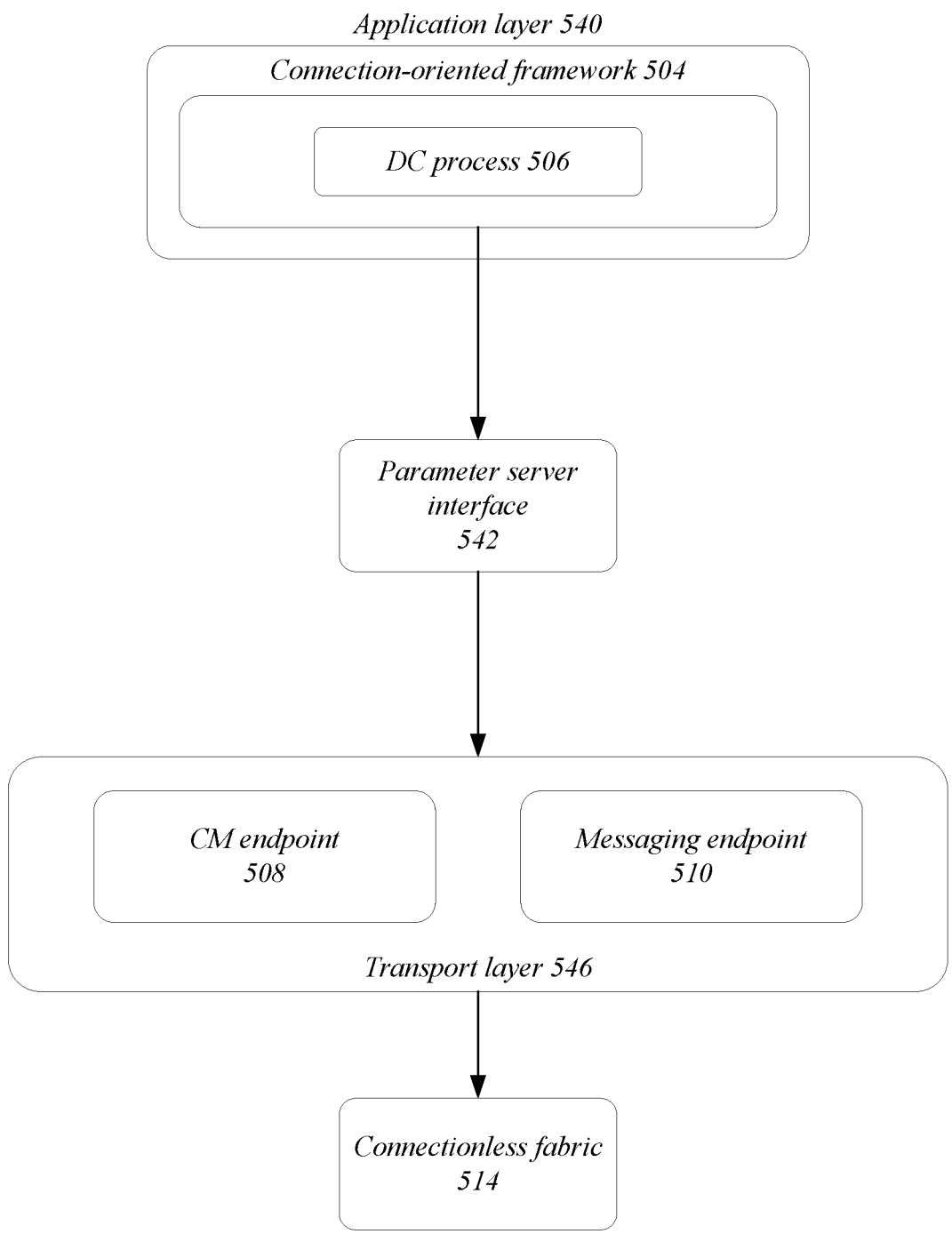
FIG. 5 illustrates exemplary aspects of a distributed computing environment according to one or more embodiments described here.

FIG. 5 illustrates exemplary aspects of a distributed computing environment 500 according to one or more embodiments described herein. Distributed computing environment 500 may include an application layer 540 with connection-oriented framework 504 and DC process 506, a parameter server interface 542, a transport layer 546 with CM endpoint 508 and messaging endpoint 510, and connectionless fabric 514. In one or more embodiments described herein, aspects or components of distributed computing environment 500 may be used to implement aspects or components of one or more distributed computing systems described herein. In many embodiments, connection-oriented framework 504 may operate on the application layer 540 while CM endpoint 508 and messaging endpoint 510 operate on the transport layer 546. Embodiments are not limited in this context.

In some embodiments, implementation of parameter server interface 542 (e.g., Ps-Lite implementation) may define a push-pull communication model for the connection-oriented framework 504. Such implementation may use a dedicated receive thread for its event-driven architecture model. This messaging receive thread may also be tasked with handling incoming connection requests for the process. In many embodiments, these two separate channels of communication may be encapsulated through separate connectionless fabric endpoints (e.g., CM endpoint 508 and messaging endpoint 510). In many such embodiments, each endpoint may map to separate messaging contexts (e.g., separate Intel® Performance Scaled Messaging 2 (PSM2) contexts. In some embodiments, different completion queues may be used to determine when an event will be received by the respective communication channel. In some such embodiments, the receive connection management channel may follow the procedures to establish communication outlined above, and potentially including the self-connect case.

In various embodiments, at first all messaging communication may be blocked until at least one connection is established. Subsequently, in some embodiments, connection management and messaging may be optimally interleaved (e.g., via multiplexers) in order to progress communication without starving or blocking connection management. Accordingly, in order to optimally handle connection management, the connection management endpoints may be added with low priority into a round robin scheduling of receive messaging handling. In various embodiments, interval connection management polling may be utilized. In various such embodiments, interval connection management polling may be selected over an interrupt model because the progress semantics (e.g., for Ps-Lite) may require polling on the completion queue of a process in order to maintain acceptable progress. Accordingly, an interrupt model for connection management may be inefficient in the context of PSM2 handling because PSM2 provides no such semantic natively and would require OS support. Further, interleaving connection management and messaging may avoid creating a background thread to do dedicated polling on the PSM2 connection management completion queue. In such instances, a dedicated thread for poling would add unnecessary contention in an already highly threaded environment.

FIG. 6 illustrates one embodiment of a logic flow 600, which may be representative of operations that may be executed in various embodiments in conjunction with establishing connections for communication between distributed computing processes and/or threads. The logic flow 600 may be representative of some or all of the operations that may be executed by one or more components/devices described herein. The embodiments are not limited in this context.

In the illustrated embodiments, logic flow 600 may begin at block 602. At block 602 "post a receive buffer at a local CM endpoint address, the receive buffer for a first communication in a connection initiator format, the connection initiator format to include a remote CM address block and a remote messaging address block" a receive buffer for a first communication in a connection initiator format may be posted at a local CM endpoint address. In various embodiments, the connection initiator format may include a remote CM address block and a remote messaging address block. For example, local receive buffer 328 may be posted in local completion queue 326 by local device 302. In some such examples, local receive buffer 328 may receive connection initiator 370 including remote CM endpoint address 372 and remote messaging endpoint address 374.

Continuing to block 604 "identify a first communication of the connection initiator format in the receive buffer, the first communication to include a remote CM endpoint address in the remote CM address block and a remote messaging endpoint address in the remote messaging address block" a first communication of the connection initiator format may be identified in the receive buffer. In some embodiments, the first communication may include a remote CM endpoint address in the remote CM address block and a remote messaging endpoint address in the remote messaging address block. For instance, connection initiator 370 with remote CM endpoint address 372 and remote messaging endpoint address 374 may be identified in local receive buffer 328 by local CM endpoint 308 of local device 302.

Proceeding to block 606 "update an address mapping with the remote messaging endpoint address to enable communication with the remote messaging endpoint address" an address mapping may be updated with the remote messaging endpoint address to enable communication with the remote messaging endpoint address. For example, local address mapping 330 of local device 302 may be updated with the remote messaging endpoint address 374. At block 608 "generate a second communication in a connection responder format to transmit to the remote CM endpoint address, the connection responder format to include a local messaging address block and the second communication to include a local messaging endpoint address in the local messaging endpoint address block" a second communication in a connection responder format may be generated for transmission to the remote CM endpoint address. In some embodiments, the connection responder format may include a local messaging address block. For example, connection responder 320 with local messaging endpoint address 324 may be generated by local CM endpoint 308 for transmission to the remote CM endpoint address 372 identified in connection initiator 370.

Continuing to block 610 "establish communication between a remote DC process thread and a local DC process thread via the remote messaging endpoint address and the local messaging endpoint address based on the first communication, the second communication, and the address mapping" communication between a remote DC process thread and a local DC process thread may be established via the remote messaging endpoint address and the local messaging endpoint address. For instance, communication between a local DC process thread of local device 302 and a remote DC process thread of remote device 352 via local messaging endpoint 310 and remote messaging endpoint 360 via the local messaging endpoint address 324 and the remote messaging endpoint address 374.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
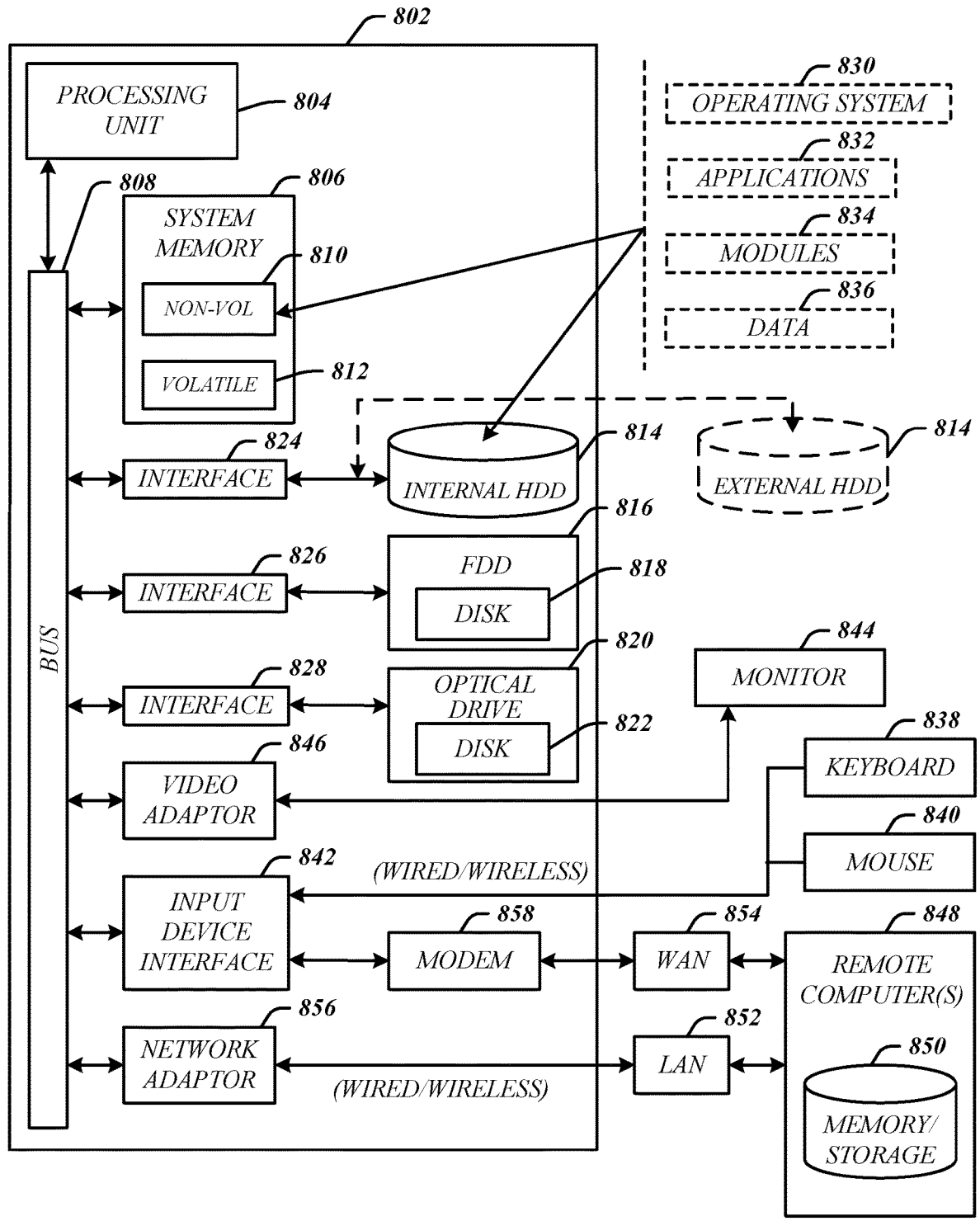
FIG. 8 illustrates an embodiment of a computing architecture according to one or more embodiments described herein.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a distributed processing system that implements or utilizes one or more components described herein. In some embodiments, computing architecture 800 may be representative, for example, of a compute node in a distributed processing system described herein that implements or utilizes one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
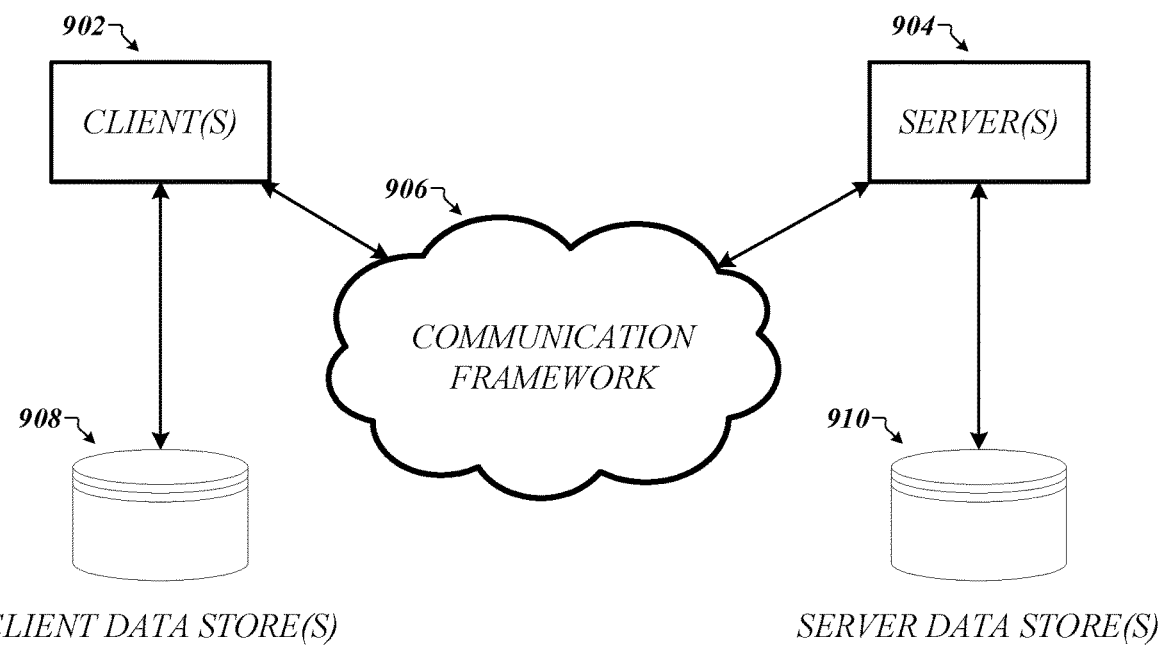
FIG. 9 illustrates an embodiment of a communications architecture according to one or more embodiments described herein.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor; and a memory comprising instructions that when executed by the processor cause the processor to: post a receive buffer at a local CM endpoint address, the receive buffer for a communication in a connection initiator format, the connection initiator format to include a remote CM address block and a remote messaging address block; identify, in the receive buffer, a first communication of the connection initiator format, the first communication to include a remote CM endpoint address in the remote CM address block and a remote messaging endpoint address in the remote messaging address block; update an address mapping with the remote messaging endpoint address to enable communication with the remote message endpoint address; generate a second communication in a connection responder format to transmit to the remote CM endpoint address, the connection responder format to include a local messaging address block and the second communication to include a local messaging endpoint address in the local messaging address block; and establish communication between a remote DC process thread and a local DC process thread via the remote messaging endpoint address and the local messaging endpoint address based on the first communication, the second communication, and the address mapping.

Example 2 includes the subject matter of Example 1, wherein the remote DC process thread and the local DC process thread operate within a connection-oriented frame work and the first and second communications traverse a connectionless mesh.

Example 3 includes the subject matter of Example 1, the memory comprising instructions that when executed by the processor cause the processor to post the receive buffer in response to execution of the local DC process thread.

Example 4 includes the subject matter of Example 1, the memory comprising instructions that when executed by the processor cause the processor to identify communications in the receive buffer based on monitoring a queue status indicator via execution of the local DC process thread.

Example 5 includes the subject matter of Example 1, wherein the first communication is transmitted to the receive buffer based on a named server address.

Example 6 includes the subject matter of Example 1, wherein the second communication is received via a remote receive buffer posted in response to execution of the remote DC process thread.

Example 7 includes the subject matter of Example 1, the memory comprising instructions that when executed by the processor cause the processor to post a second receive buffer for another communication in the connection initiator format in response to identification of the first communication in the receive buffer.

Example 8 includes the subject matter of Example 1, the memory comprising instructions that when executed by the processor cause the processor to establish communication between a second remote DC process thread and the local DC process thread based on a third communication in the connection initiator format comprising another remote messaging endpoint address and another remote messaging endpoint address.

Example 9 includes the subject matter of Example 8, wherein the first and third communications are interleaved via time-division multiplexing.

Example 10 includes the subject matter of Example 1, the memory comprising instructions that when executed by the processor cause the processor to establish communication between a second remote DC process thread and the local DC process thread based on a third communication received at a second local CM endpoint address, the second remote DC process thread and the local DC process thread to communicate via a second remote messaging endpoint address and the local messaging endpoint address.

Example 11 includes the subject matter of Example 10, wherein the first and third communications are interleaved via time-division multiplexing.

Example 12 includes the subject matter of Example 1, wherein the receive buffer and the local CM endpoint address are located at a completion queue.

Example 13 includes the subject matter of Example 1, wherein the local DC process thread executes on an application layer and the local CM endpoint address and the local messaging endpoint address are associated with a transport layer.

Example 14 is an apparatus, the apparatus comprising: a processor; and a memory comprising instructions that when executed by the processor cause the processor to: generate a first communication in a connection initiator format to transmit to a remote CM endpoint address from a local CM endpoint address, the connection initiator format to include a local CM address block and a local messaging address block and the first communication to include the local CM endpoint address in the local CM address block and a local messaging endpoint address in the local messaging address block; post a receive buffer at the local CM endpoint address based on the first communication; identify, in the receive buffer, a second communication of a connection responder format, the connection responder format to include a remote messaging address block and the second communication to include a remote messaging endpoint address in the remote messaging address block; update an address mapping with the remote messaging endpoint address to enable communication with the remote message endpoint address; and establish communication between a remote DC process thread and a local DC process thread via the remote messaging endpoint address and the local messaging endpoint address based on the first communication, the second communication, and the address mapping.

Example 15 includes the subject matter of Example 14, wherein the remote DC process thread and the local DC process thread operate within a connection-oriented frame work and the first and second communications traverse a connectionless mesh.

Example 16 includes the subject matter of Example 14, the memory comprising instructions that when executed by the processor cause the processor to post the receive buffer in response to execution of the local DC process thread.

Example 17 includes the subject matter of Example 14, the memory comprising instructions that when executed by the processor cause the processor to identify communications in the receive buffer based on monitoring a queue status indicator via execution of the local DC process thread.

Example 18 includes the subject matter of Example 14, wherein the remote CM endpoint address comprises a named server address.

Example 19 includes the subject matter of Example 14, wherein the first communication is received via a remote receive buffer posted in response to execution of the remote DC process thread.

Example 20 includes the subject matter of Example 14, the memory comprising instructions that when executed by the processor cause the processor to post a second receive buffer for another communication in the connection initiator format in response to transmission of a third communication from a second local CM endpoint address to a second remote CM endpoint address.

Example 21 includes the subject matter of Example 20, wherein the third communication is of the connection initiator format and includes the second local CM endpoint address in the local CM address block and the local messaging endpoint address in the local messaging address block.

Example 22 includes the subject matter of Example 21, wherein the first and third communications are interleaved via time-division multiplexing.

Example 23 includes the subject matter of Example 14, wherein the receive buffer and the local CM endpoint address are located at a completion queue.

Example 24 includes the subject matter of Example 14, wherein the local DC process thread executes on an application layer and the local CM endpoint address and the local messaging endpoint address are associated with a transport layer.

Example 25 is at least one non-transitory computer-readable medium comprising a set of instructions that, in response to being executed by a processor circuit, cause the processor circuit to: post a receive buffer at a local CM endpoint address, the receive buffer for a communication in a connection initiator format, the connection initiator format to include a remote CM address block and a remote messaging address block; identify, in the receive buffer, a first communication of the connection initiator format, the first communication to include a remote CM endpoint address in the remote CM address block and a remote messaging endpoint address in the remote messaging address block; update an address mapping with the remote messaging endpoint address to enable communication with the remote message endpoint address; generate a second communication in a connection responder format to transmit to the remote CM endpoint address, the connection responder format to include a local messaging address block and the second communication to include a local messaging endpoint address in the local messaging endpoint block; and establish communication between a remote DC process thread and a local DC process thread via the remote messaging endpoint address and the local messaging endpoint address based on the first communication, the second communication, and the address mapping.

Example 26 includes the subject matter of Example 25, wherein the remote DC process thread and the local DC process thread operate within a connection-oriented frame work and the first and second communications traverse a connectionless mesh.

Example 27 includes the subject matter of Example 25, comprising instructions that, in response to being executed by the processor circuit, cause the processor circuit to post the receive buffer in response to execution of the local DC process thread.

Example 28 includes the subject matter of Example 25, comprising instructions that, in response to being executed by the processor circuit, cause the processor circuit to identify communications in the receive buffer based on monitoring a queue status indicator via execution of the local DC process thread.

Example 29 includes the subject matter of Example 25, wherein the first communication is transmitted to the receive buffer based on a named server address.

Example 30 includes the subject matter of Example 25, wherein the second communication is received via a remote receive buffer posted in response to execution of the remote DC process thread.

Example 31 includes the subject matter of Example 25, comprising instructions that, in response to being executed by the processor circuit, cause the processor circuit to post a second receive buffer for another communication in the connection initiator format in response to identification of the first communication in the receive buffer.

Example 32 includes the subject matter of Example 25, comprising instructions that, in response to being executed by the processor circuit, cause the processor circuit to establish communication between a second remote DC process thread and the local DC process thread based on a third communication in the connection initiator format comprising another remote messaging endpoint address and another remote messaging endpoint address.

Example 33 includes the subject matter of Example 32, wherein the first and third communications are interleaved via time-division multiplexing.

Example 34 includes the subject matter of Example 25, comprising instructions that, in response to being executed by the processor circuit, cause the processor circuit to establish communication between a second remote DC process thread and the local DC process thread based on a third communication received at a second local CM endpoint address, the second remote DC process thread and the local DC process thread to communicate via a second remote messaging endpoint address and the local messaging endpoint address.

Example 35 includes the subject matter of Example 34, wherein the first and third communications are interleaved via time-division multiplexing.

Example 36 includes the subject matter of Example 25, wherein the receive buffer and the local CM endpoint address are located at a completion queue.

Example 37 includes the subject matter of Example 25, wherein the local DC process thread executes on an application layer and the local CM endpoint address and the local messaging endpoint address are associated with a transport layer.

Example 38 is at least one non-transitory computer-readable medium comprising a set of instructions that, in response to being executed by a processor circuit, cause the processor circuit to: generate a first communication in a connection initiator format to transmit to a remote CM endpoint address from a local CM endpoint address, the connection initiator format to include a local CM address block and a local messaging address block and the first communication to include the local CM endpoint address in the local CM address block and a local messaging endpoint address in the local messaging address block; post a receive buffer at the local CM endpoint address based on the first communication; identify, in the receive buffer, a second communication of a connection responder format, the connection responder format to include a remote messaging address block and the second communication to include a remote messaging endpoint address in the remote messaging address block; update an address mapping with the remote messaging endpoint address to enable communication with the remote message endpoint address; and establish communication between a remote DC process thread and a local DC process thread via the remote messaging endpoint address and the local messaging endpoint address based on the first communication, the second communication, and the address mapping.

Example 39 includes the subject matter of Example 38, wherein the remote DC process thread and the local DC process thread operate within a connection-oriented framework and the first and second communications traverse a connectionless mesh.

Example 40 includes the subject matter of Example 38, comprising instructions that, in response to being executed by the processor circuit, cause the processor circuit to post the receive buffer in response to execution of the local DC process thread.

Example 41 includes the subject matter of Example 38, comprising instructions that, in response to being executed by the processor circuit, cause the processor circuit to identify communications in the receive buffer based on monitoring a queue status indicator via execution of the local DC process thread.

Example 42 includes the subject matter of Example 38, wherein the remote CM endpoint address comprises a named server address.

Example 43 includes the subject matter of Example 38, wherein the first communication is received via a remote receive buffer posted in response to execution of the remote DC process thread.

Example 44 includes the subject matter of Example 38, comprising instructions that, in response to being executed by the processor circuit, cause the processor circuit to post a second receive buffer for another communication in the connection initiator format in response to transmission of a third communication from a second local CM endpoint address to a second remote CM endpoint address.

Example 45 includes the subject matter of Example 44, wherein the third communication is of the connection initiator format and includes the second local CM endpoint address in the local CM address block and the local messaging endpoint address in the local messaging address block.

Example 46 includes the subject matter of Example 45, wherein the first and third communications are interleaved via time-division multiplexing.

Example 47 includes the subject matter of Example 38, wherein the receive buffer and the local CM endpoint address are located at a completion queue.

Example 48 includes the subject matter of Example 38, wherein the local DC process thread executes on an application layer and the local CM endpoint address and the local messaging endpoint address are associated with a transport layer.

Example 49 is a computer-implemented method, comprising: posting a receive buffer at a local CM endpoint address, the receive buffer for a communication in a connection initiator format, the connection initiator format to include a remote CM address block and a remote messaging address block; identifying, in the receive buffer, a first communication of the connection initiator format, the first communication to include a remote CM endpoint address in the remote CM address block and a remote messaging endpoint address in the remote messaging address block; updating an address mapping with the remote messaging endpoint address to enable communication with the remote message endpoint address; generating a second communication in a connection responder format to transmit to the remote CM endpoint address, the connection responder format to include a local messaging address block and the second communication to include a local messaging endpoint address in the local messaging address block; and establishing communication between a remote DC process thread and a local DC process thread via the remote messaging endpoint address and the local messaging endpoint address based on the first communication, the second communication, and the address mapping.

Example 50 includes the subject matter of Example 49, wherein the remote DC process thread and the local DC process thread operate within a connection-oriented framework and the first and second communications traverse a connectionless mesh.

Example 51 includes the subject matter of Example 49, comprising posting the receive buffer in response to execution of the local DC process thread.

Example 52 includes the subject matter of Example 49, comprising identifying communications in the receive buffer based on monitoring a queue status indicator via execution of the local DC process thread.

Example 53 includes the subject matter of Example 49, wherein the first communication is transmitted to the receive buffer based on a named server address.

Example 54 includes the subject matter of Example 49, wherein the second communication is received via a remote receive buffer posted in response to execution of the remote DC process thread.

Example 55 includes the subject matter of Example 49, comprising posting a second receive buffer for another communication in the connection initiator format in response to identification of the first communication in the receive buffer.

Example 56 includes the subject matter of Example 49, comprising establishing communication between a second remote DC process thread and the local DC process thread based on a third communication in the connection initiator format comprising another remote messaging endpoint address and another remote messaging endpoint address.

Example 57 includes the subject matter of Example 56, wherein the first and third communications are interleaved via time-division multiplexing.

Example 58 includes the subject matter of Example 49, comprising establishing communication between a second remote DC process thread and the local DC process thread based on a third communication received at a second local CM endpoint address, the second remote DC process thread and the local DC process thread to communicate via a second remote messaging endpoint address and the local messaging endpoint address.

Example 59 includes the subject matter of Example 58, wherein the first and third communications are interleaved via time-division multiplexing.

Example 60 includes the subject matter of Example 49, wherein the receive buffer and the local CM endpoint address are located at a completion queue.

Example 61 includes the subject matter of Example 49, wherein the local DC process thread executes on an application layer and the local CM endpoint address and the local messaging endpoint address are associated with a transport layer.

Example 62 is a computer-implemented method, comprising: generating a first communication in a connection initiator format to transmit to a remote CM endpoint address from a local CM endpoint address, the connection initiator format to include a local CM address block and a local messaging address block and the first communication to include the local CM endpoint address in the local CM address block and a local messaging endpoint address in the local messaging address block; posting a receive buffer at the local CM endpoint address based on the first communication; identifying, in the receive buffer, a second communication of a connection responder format, the connection responder format to include a remote messaging address block and the second communication to include a remote messaging endpoint address in the remote messaging address block; updating an address mapping with the remote messaging endpoint address to enable communication with the remote message endpoint address; and establishing communication between a remote DC process thread and a local DC process thread via the remote messaging endpoint address and the local messaging endpoint address based on the first communication, the second communication, and the address mapping.

Example 63 includes the subject matter of Example 62, wherein the remote DC process thread and the local DC process thread operate within a connection-oriented framework and the first and second communications traverse a connectionless mesh.

Example 64 includes the subject matter of Example 62, comprising posting the receive buffer in response to execution of the local DC process thread.

Example 65 includes the subject matter of Example 62, comprising identifying communications in the receive buffer based on monitoring a queue status indicator via execution of the local DC process thread.

Example 66 includes the subject matter of Example 62, wherein the remote CM endpoint address comprises a named server address.

Example 67 includes the subject matter of Example 62, wherein the first communication is received via a remote receive buffer posted in response to execution of the remote DC process thread.

Example 68 includes the subject matter of Example 62, comprising posting a second receive buffer for another communication in the connection initiator format in response to transmission of a third communication from a second local CM endpoint address to a second remote CM endpoint address.

Example 69 includes the subject matter of Example 68, wherein the third communication is of the connection initiator format and includes the second local CM endpoint address in the local CM address block and the local messaging endpoint address in the local messaging address block.

Example 70 includes the subject matter of Example 69, wherein the first and third communications are interleaved via time-division multiplexing.

Example 71 includes the subject matter of Example 62, wherein the receive buffer and the local CM endpoint address are located at a completion queue.

Example 72 includes the subject matter of Example 62, wherein the local DC process thread executes on an application layer and the local CM endpoint address and the local messaging endpoint address are associated with a transport layer.

Example 73 is an apparatus, comprising: means for posting a receive buffer at a local CM endpoint address, the receive buffer for a communication in a connection initiator format, the connection initiator format to include a remote CM address block and a remote messaging address block; means for identifying, in the receive buffer, a first communication of the connection initiator format, the first communication to include a remote CM endpoint address in the remote CM address block and a remote messaging endpoint address in the remote messaging address block; means for updating an address mapping with the remote messaging endpoint address to enable communication with the remote message endpoint address; means for generating a second communication in a connection responder format to transmit to the remote CM endpoint address, the connection responder format to include a local messaging address block and the second communication to include a local messaging endpoint address in the local messaging address block; and means for establishing communication between a remote DC process thread and a local DC process thread via the remote messaging endpoint address and the local messaging endpoint address based on the first communication, the second communication, and the address mapping.

Example 74 includes the subject matter of Example 73, wherein the remote DC process thread and the local DC process thread operate within a connection-oriented frame work and the first and second communications traverse a connectionless mesh.

Example 75 includes the subject matter of Example 73, comprising means for posting the receive buffer in response to execution of the local DC process thread.

Example 76 includes the subject matter of Example 73, comprising means for identifying communications in the receive buffer based on monitoring a queue status indicator via execution of the local DC process thread.

Example 77 includes the subject matter of Example 73, wherein the first communication is transmitted to the receive buffer based on a named server address.

Example 78 includes the subject matter of Example 73, wherein the second communication is received via a remote receive buffer posted in response to execution of the remote DC process thread.

Example 79 includes the subject matter of Example 73, comprising means for posting a second receive buffer for another communication in the connection initiator format in response to identification of the first communication in the receive buffer.

Example 80 includes the subject matter of Example 73, comprising means for establishing communication between a second remote DC process thread and the local DC process thread based on a third communication in the connection initiator format comprising another remote messaging endpoint address and another remote messaging endpoint address.

Example 81 includes the subject matter of Example 80, wherein the first and third communications are interleaved via time-division multiplexing.

Example 82 includes the subject matter of Example 73, comprising means for establishing communication between a second remote DC process thread and the local DC process thread based on a third communication received at a second local CM endpoint address, the second remote DC process thread and the local DC process thread to communicate via a second remote messaging endpoint address and the local messaging endpoint address.

Example 83 includes the subject matter of Example 82, wherein the first and third communications are interleaved via time-division multiplexing.

Example 84 includes the subject matter of Example 73, wherein the receive buffer and the local CM endpoint address are located at a completion queue.

Example 85 includes the subject matter of Example 73, wherein the local DC process thread executes on an application layer and the local CM endpoint address and the local messaging endpoint address are associated with a transport layer.

Example 86 is an apparatus, comprising: means for generating a first communication in a connection initiator format to transmit to a remote CM endpoint address from a local CM endpoint address, the connection initiator format to include a local CM address block and a local messaging address block and the first communication to include the local CM endpoint address in the local CM address block and a local messaging endpoint address in the local messaging address block; means for posting a receive buffer at the local CM endpoint address based on the first communication; means for identifying, in the receive buffer, a second communication of a connection responder format, the connection responder format to include a remote messaging address block and the second communication to include a remote messaging endpoint address in the remote messaging address block; means for updating an address mapping with the remote messaging endpoint address to enable communication with the remote message endpoint address; and means for establishing communication between a remote DC process thread and a local DC process thread via the remote messaging endpoint address and the local messaging endpoint address based on the first communication, the second communication, and the address mapping.

Example 87 includes the subject matter of Example 86, wherein the remote DC process thread and the local DC process thread operate within a connection-oriented frame work and the first and second communications traverse a connectionless mesh.

Example 88 includes the subject matter of Example 86, comprising means for posting the receive buffer in response to execution of the local DC process thread.

Example 89 includes the subject matter of Example 86, comprising means for identifying communications in the receive buffer based on monitoring a queue status indicator via execution of the local DC process thread.

Example 90 includes the subject matter of Example 86, wherein the remote CM endpoint address comprises a named server address.

Example 91 includes the subject matter of Example 86, wherein the first communication is received via a remote receive buffer posted in response to execution of the remote DC process thread.

Example 92 includes the subject matter of Example 86, comprising means for posting a second receive buffer for another communication in the connection initiator format in response to transmission of a third communication from a second local CM endpoint address to a second remote CM endpoint address.

Example 93 includes the subject matter of Example 92, wherein the third communication is of the connection initiator format and includes the second local CM endpoint address in the local CM address block and the local messaging endpoint address in the local messaging address block.

Example 94 includes the subject matter of Example 93, wherein the first and third communications are interleaved via time-division multiplexing.

Example 95 includes the subject matter of Example 86, wherein the receive buffer and the local CM endpoint address are located at a completion queue.

Example 96 includes the subject matter of Example 86, wherein the local DC process thread executes on an application layer and the local CM endpoint address and the local messaging endpoint address are associated with a transport layer.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, the apparatus comprising:
a processor; and
a memory comprising instructions that when executed by the processor cause the processor to:
post a receive buffer at a local connection manager (CM) endpoint address, the receive buffer for a communication in a connection initiator format, the connection initiator format to include a remote CM address block and a remote messaging address block;
identify, in the receive buffer, a first communication of the connection initiator format, the first communication to include a remote CM endpoint address in the remote CM address block and a remote messaging endpoint address in the remote messaging address block;
generate a second communication in a connection responder format to transmit to the remote CM endpoint address, the connection responder format to include a local messaging address block and the second communication to include a local messaging endpoint address in the local messaging address block; and
establish communication between a remote distributed computing (DC) process thread and a local DC process thread via the remote messaging endpoint address and the local messaging endpoint address based on the first communication and the second communication.

2. The apparatus of claim 1, the memory comprising instructions that when executed by the processor cause the processor to:
update an address mapping with the remote messaging endpoint address to enable communication with the remote message endpoint address; and
establish communication between the remote DC process thread and the local DC process thread via the remote messaging endpoint address and the local messaging endpoint address based on the first communication, the second communication, and the address mapping.

3. The apparatus of claim 1, wherein the remote DC process thread and the local DC process thread operate within a connection-oriented frame work and the first and second communications traverse a connectionless mesh.

4. The apparatus of claim 1, the memory comprising instructions that when executed by the processor cause the processor to post the receive buffer in response to execution of the local DC process thread.

5. The apparatus of claim 1, the memory comprising instructions that when executed by the processor cause the processor to identify communications in the receive buffer based on monitoring a queue status indicator via execution of the local DC process thread.

6. The apparatus of claim 1, wherein the second communication is received via a remote receive buffer posted in response to execution of the remote DC process thread.

7. The apparatus of claim 1, the memory comprising instructions that when executed by the processor cause the processor to post a second receive buffer for another communication in the connection initiator format in response to identification of the first communication in the receive buffer.

8. The apparatus of claim 1, the memory comprising instructions that when executed by the processor cause the processor to establish communication between a second remote DC process thread and the local DC process thread based on a third communication in the connection initiator format comprising another remote messaging endpoint address and another remote messaging endpoint address.

9. The apparatus of claim 8, wherein the first and third communications are interleaved via time-division multiplexing.

10. The apparatus of claim 1, the memory comprising instructions that when executed by the processor cause the processor to establish communication between a second remote DC process thread and the local DC process thread based on a third communication received at a second local CM endpoint address, the second remote DC process thread and the local DC process thread to communicate via a second remote messaging endpoint address and the local messaging endpoint address.

11. The apparatus of claim 10, wherein the first and third communications are interleaved via time-division multiplexing.

12. The apparatus of claim 1, wherein the receive buffer and the local CM endpoint address are located at a completion queue.

13. The apparatus of claim 1, wherein the local DC process thread executes on an application layer and the local CM endpoint address and the local messaging endpoint address are associated with a transport layer.

14. At least one non-transitory computer-readable medium comprising a set of instructions that, in response to being executed by a processor circuit, cause the processor circuit to:
generate a first communication in a connection initiator format to transmit to a remote connection manager (CM) endpoint address from a local CM endpoint address, the connection initiator format to include a local CM address block and a local messaging address block and the first communication to include the local CM endpoint address in the local CM address block and a local messaging endpoint address in the local messaging address block;
post a receive buffer at the local CM endpoint address based on the first communication;
identify, in the receive buffer, a second communication of a connection responder format, the connection responder format to include a remote messaging address block and the second communication to include a remote messaging endpoint address in the remote messaging address block; and
establish communication between a remote distributed computing (DC) process thread and a local DC process thread via the remote messaging endpoint address and the local messaging endpoint address based on the first communication and the second communication.

15. The at least one non-transitory computer-readable medium of claim 14, comprising instructions that, in response to being executed by the processor circuit, cause the processor circuit to:
update an address mapping with the remote messaging endpoint address to enable communication with the remote message endpoint address; and
establish communication between the remote DC process thread and the local DC process thread via the remote messaging endpoint address and the local messaging endpoint address based on the first communication, the second communication, and the address mapping.

16. The at least one non-transitory computer-readable medium of claim 14, comprising instructions that, in response to being executed by the processor circuit, cause the processor circuit to post the receive buffer in response to execution of the local DC process thread.

17. The at least one non-transitory computer-readable medium of claim 14, comprising instructions that, in response to being executed by the processor circuit, cause the processor circuit to identify communications in the receive buffer based on monitoring a queue status indicator via execution of the local DC process thread.

18. The at least one non-transitory computer-readable medium of claim 14, wherein the remote CM endpoint address comprises a named server address.

19. The at least one non-transitory computer-readable medium of claim 14, wherein the first communication is received via a remote receive buffer posted in response to execution of the remote DC process thread.

20. A computer-implemented method, comprising:
    generating a first communication in a connection initiator format to transmit to a remote connection manager (CM) endpoint address from a local CM endpoint address, the connection initiator format to include a local CM address block and a local messaging address block and the first communication to include the local CM endpoint address in the local CM address block and a local messaging endpoint address in the local messaging address block;
    posting a receive buffer at the local CM endpoint address based on the first communication;
    identifying, in the receive buffer, a second communication of a connection responder format, the connection responder format to include a remote messaging address block and the second communication to include a remote messaging endpoint address in the remote messaging address block; and
    establishing communication between a remote distributed computing (DC) process thread and a local DC process thread via the remote messaging endpoint address and the local messaging endpoint address based on the first communication and the second communication.

21. The computer-implemented method of claim 20, comprising posting a second receive buffer for another communication in the connection initiator format in response to transmission of a third communication from a second local CM endpoint address to a second remote CM endpoint address.

22. The computer-implemented method of claim 21, wherein the third communication is of the connection initiator format and includes the second local CM endpoint address in the local CM address block and the local messaging endpoint address in the local messaging address block.

23. The computer-implemented method of claim 22, wherein the first and third communications are interleaved via time-division multiplexing.

24. The computer-implemented method of claim 20, comprising:
    updating an address mapping with the remote messaging endpoint address to enable communication with the remote message endpoint address; and
    establishing communication between the remote DC process thread and the local DC process thread via the remote messaging endpoint address and the local messaging endpoint address based on the first communication, the second communication, and the address mapping.

25. The computer-implemented method of claim 20, wherein the local DC process thread executes on an application layer and the local CM endpoint address and the local messaging endpoint address are associated with a transport layer.

* * * * *